US012291425B2

(12) United States Patent
Foschini et al.

(10) Patent No.: US 12,291,425 B2
(45) Date of Patent: May 6, 2025

(54) APPARATUS FOR ELEVATOR DRIVE ASSEMBLY

(71) Applicant: Otis Elevator Company, Farmington, CT (US)

(72) Inventors: Gianluca Foschini, Milan (IT); Andres Monzon, Madrid (ES); Javier Garcia Casla, Madrid (ES); Santiago Gil, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/524,978

(22) Filed: Nov. 30, 2023

(65) Prior Publication Data

US 2024/0294360 A1 Sep. 5, 2024

(30) Foreign Application Priority Data

Mar. 3, 2023 (EP) .................................... 23382196

(51) Int. Cl.

| | |
|---|---|
| ***B66B 11/00*** | (2006.01) |
| ***B66B 1/36*** | (2006.01) |
| ***B66B 11/04*** | (2006.01) |
| ***B66B 19/00*** | (2006.01) |

(52) U.S. Cl.
CPC ............ *B66B 11/0045* (2013.01); *B66B 1/36* (2013.01); *B66B 11/043* (2013.01); *B66B 19/005* (2013.01)

(58) Field of Classification Search
CPC .. B66B 11/0045; B66B 11/043; B66B 19/005
See application file for complete search history.

(56) References Cited

U.S. PATENT DOCUMENTS

| | | | | |
|---|---|---|---|---|
| 6,601,828 B2 * | 8/2003 | Strbuncelj | B66B 11/043 | 187/254 |
| 6,663,086 B2 * | 12/2003 | Huang | B66D 1/22 | 254/344 |
| 8,631,907 B2 * | 1/2014 | Piech | H02K 5/24 | 187/254 |
| 8,839,911 B2 * | 9/2014 | Hubbard | H02K 5/24 | 187/254 |
| 10,207,899 B2 * | 2/2019 | Fauconnet | B66B 11/0035 | |
| 10,246,299 B2 * | 4/2019 | Fargo | B66B 11/0045 | |
| 10,252,889 B2 * | 4/2019 | Bruno | B66B 11/04 | |
| 2006/0151251 A1 | 7/2006 | Rennetaud | | |
| 2011/0240407 A1 | 10/2011 | Ericson | | |
| 2011/0240410 A1 | 10/2011 | Barrio et al. | | |
| 2018/0334361 A1 | 11/2018 | Fauconnet et al. | | |
| 2019/0233253 A1 | 8/2019 | St. Pierre et al. | | |

OTHER PUBLICATIONS

European Search Report for application EP23382196.6, dated Aug. 8, 2023, 65 pages.

* cited by examiner

*Primary Examiner* — Diem M Tran
(74) *Attorney, Agent, or Firm* — CANTOR COLBURN LLP

(57) ABSTRACT

An apparatus (10) for connecting a drive assembly (4) to a bedplate (2) of an elevator system. The apparatus (10) includes a first support (14) for mounting a motor (6) of the drive assembly (4) to the bedplate (2). The apparatus (10) further includes a second support (16) for mounting a brake unit (8) of the drive assembly (4) to the bedplate (2). The first support (14) and the second support (16) are separate parts.

11 Claims, 10 Drawing Sheets

APPARATUS FOR ELEVATOR DRIVE ASSEMBLY

FOREIGN PRIORITY

This application claims priority to European Patent Application No. 23382196.6, filed Mar. 3, 2023, and all the benefits accruing therefrom under 35 U.S.C. § 119, the contents of which in its entirety are herein incorporated by reference.

TECHNICAL FIELD

This disclosure relates to a means for supporting a drive assembly of an elevator system. In particular, the disclosure may be applicable to a means for attaching a motor and brake system to the bedplate of an elevator system.

BACKGROUND

In many elevator systems, the drive assembly is located at the top of the elevator shaft. It is typically mounted to and supported by a bedplate. The drive assembly includes a motor and a brake unit. In order to hold the drive assembly in its intended position, the motor and brake unit are each mounted to a unit which is in turn mounted to the bedplate of the elevator system. The bedplate is a structural beam (or set of beams) that provides a rigid supporting structure for the drive assembly. The bedplate may be mounted centrally or to one side of the shaft. It is often connected to, and extends between, two guide rails. The unit is typically formed from cast iron, but in some examples the unit may be moulded and/or machined from a billet or block of steel or aluminium.

As the unit extends between the motor and the brake unit, it is typically heavy, meaning that the bedplate may require reinforcement in order to support the apparatus. The forces involved in the lifting and lowering of the elevator car (including vibrations of the motor) are significant and require reinforcement of the bedplate in the region where the unit is mounted. This increases the number of parts in the bedplate, which in turn increases the complexity, cost, and time required for manufacture and installation. Therefore, an object of the present invention is to reduce the weight and complexity of mounting and supporting the drive assembly on the bedplate.

SUMMARY OF THE DISCLOSURE

According to a first aspect of the present disclosure, there is provided an apparatus for connecting a drive assembly to a bedplate of an elevator system, the apparatus comprising: a first support for mounting a motor of the drive assembly to the bedplate; and a second support for mounting a brake unit of the drive assembly to the bedplate; wherein the first support and the second support are separate parts.

The first support secures the motor in its correct position in the elevator system, i.e. correctly positioned relative to the other components of the elevator system.

The second support secures the brake unit in its correct position in the elevator system, i.e. correctly positioned relative to the other components of the elevator system, and in particular, relative to the motor.

Providing the first support and the second support as separate parts is advantageous for a number of reasons. One reason is that the same supports can be used for different drive assemblies, or different configurations of the drive assembly. For example, the distance between the motor and the brake unit may be different for different elevator systems (e.g. to accommodate more drive sheaves and/or more ropes/belts). As they are separate components, the first support and the second support may be placed at any distance apart, such that the motor and brake unit are located in suitable positions for a given drive assembly. Therefore, this arrangement is more adaptable and configurable for connecting a drive assembly to a bedplate of an elevator system. This may allow a motor and brake unit with the same specifications to be used across a wide range of elevator systems without requiring additional specific parts to be manufactured (whereas previously a different cast iron case would be required or each installation, e.g. to accommodate different distances between the motor and the brake unit). This simplifies the manufacturing and installation process, thereby reducing costs.

In some examples, the first support and/or the second support may comprise a substantially vertical mounting surface. At least one dimension of the mounting surface of the first support may be substantially the same as a dimension of the motor. For example, the height and/or width of the mounting surface of the first support may be substantially the same as the height and/or width and/or diameter of the motor. At least one dimension of the mounting surface of the second support may be substantially the same as a dimension of the brake unit. For example, the height and/or width of the mounting surface of the second support may be substantially the same as the height and/or width of the brake unit. Thus the motor and/or brake unit can be mounted to the respective mounting surface(s) in a compact manner while being fully and firmly supported and connected to the bedplate.

The bedplate may be a substantially horizontal component. The bedplate may have any suitable shape and size. In some examples, the bedplate may be formed of a plurality of component parts. For example, the bedplate may be an I-beam formed of two c-shaped components arranged back to back.

In some examples, the apparatus further comprises an intermediate connecting part; wherein at least one of the first support and the second support is connected to the bedplate via the intermediate connecting part.

The first support and the second support may be mounted to the intermediate connecting part with the intermediate connecting part in turn mounted to the bedplate. In some examples both the first support and the second support are connected to the bedplate via the intermediate connecting part.

The intermediate connecting part may be configured to provide reinforcement to the bedplate. The intermediate connecting part may help to increase the strength of the bedplate, and help to prevent the bedplate from bending or twisting under the forces exerted by the drive assembly. The intermediate connecting part thus performs two separate functions; mounting the motor and the brake unit; and reinforcing the bedplate. This is advantageous as the bedplate itself can be formed as a simpler structure. Thus, whereas it has previously been necessary to include separate reinforcement members on the bedplate in the vicinity of the drive assembly, the intermediate connecting part can perform this function in addition to mounting and appropriately locating the motor and brake unit.

In some examples, the intermediate connecting part may be formed of four c-shaped parts. Two of the c-shaped parts may be substantially perpendicular to a longitudinal axis of the bedplate, and two of the c-shaped parts may be substantially parallel to a longitudinal axis of the bedplate. One pair of c-shaped parts may wrap around the outside of the other pair of c-shaped parts, such that the intermediate connecting part is a quadrilateral with an open space in the centre. This arrangement provides a particularly strong and lightweight structure which adequately supports the motor and brake unit. The open space in the centre allows the traction members (belts, ropes, cables, etc.) to pass through the open space down to the elevator car and/or counterweight. Conveniently, each of the individual c-shaped parts may be formed from sheet metal, e.g. formed from a single sheet bent along two parallel lines to form a square c-shape.

In some examples, the intermediate connecting part may be formed from a single piece (e.g. a planar sheet of material, e.g. metal). The single piece may be bent or shaped such that it fits around the bedplate.

In some examples, the first support is formed from sheet metal. In some examples, the second support is formed from sheet metal. In some examples, the intermediate connecting part is formed from sheet metal.

Sheet metal is light weight and inexpensive, yet it can still provide the strength and rigidity required to mount and support the drive assembly. In particular, sheet metal is significantly lighter and cheaper than the cast iron housing which has been used previously.

Sheet metal is also easy to cut into shape to form the components of the apparatus. This may help to ensure that the parts can be adapted for the specific configuration of an elevator system. For example, if the motor and brake unit are close together, an intermediate connecting part formed from sheet metal may be cut down (e.g. cut down in length) without affecting its structural properties to fit in between the motor and brake unit. Being able to form the components easily (e.g. by cutting and shaping sheet metal) may also help to make manufacture and installation of the apparatus easier, faster and more cost effective.

In some examples, the apparatus is formed primarily of sheet metal. The term primarily may be understood here to mean that the first support and second support (and intermediate support(s), if present) are formed from sheet metal, but that other components such as fasteners (e.g. screws, bolts, rivets, etc.) are not sheet metal.

In some examples, the intermediate connecting part extends along at least part of a side of the bedplate. In some examples, the intermediate connecting part extends along at least part of a bottom surface of the bedplate.

Such arrangements provide additional reinforcement to the bedplate. In particular, this may help to prevent bending and/or twisting of the bedplate by increasing the strength of at least one of the external surfaces of the bedplate. Notably, this additional reinforcement of the bedplate may be achieved without the addition of any extra components. Therefore, this arrangement provides a way to reinforce the bedplate without increasing the complexity of the structure of the bedplate.

In some examples, the drive assembly further comprises a drive shaft connected between the motor and the brake unit; and the apparatus further comprises at least one bearing stand configured to support a drive shaft of the drive assembly.

The bearing stand(s) may be configured to hold the drive shaft in its intended position, supporting the loads of the elevator car and counterweight in a low friction manner.

In some examples, at least one bearing stand is formed integrally with the first support. In some examples, at least one bearing stand is formed integrally with the second support.

Forming the bearing stand(s) integrally with the first support and/or second support reduces the number of components in the apparatus, thereby reducing the complexity and cost of manufacturing and assembly.

In some examples, the apparatus further comprises at least one bearing stand support; wherein each bearing stand support is configured to support at least one bearing stand and to connect at least one bearing stand to the bedplate. Such bearing stand supports are useful where an existing bearing stand component is available (e.g. as an off-the-shelf component or a component designed for an existing model) but is not itself at the right height above the bedplate for the drive shaft. A simple and inexpensive bearing stand support can be formed to position the bearing stand at the appropriate height. In some examples, the bearing stand(s) are connected to a top surface of the bearing stand support(s).

In some examples, the at least one bearing stand support is formed from sheet metal. As discussed above, sheet metal can be used to provide a lightweight and inexpensive structure that is easy to manufacture.

In some examples, at least one of the first support and the second support may be formed integrally with the bedplate. For example, an upper surface of the bedplate could be formed from sheet metal with either the first support or second support being formed by folding that sheet metal part. The other of the first support and second support would still be a separate part, thereby allowing adjustment of the relative distance between the two parts so as to accommodate different sizes of motor, brake and/or drive shaft.

In some examples, the drive assembly further comprises a drive shaft connected between the motor and the brake unit; at least one drive sheave mounted on the drive shaft; and at least one tension member wrapped at least partially around the at least one drive sheave; wherein the apparatus further comprises a retainer configured to retain the at least one tension member on the at least one drive sheave.

The retainer may be any suitable shape and size. In some examples, the retainer may be formed of a plurality of parts. In some examples, at least one (and possibly more than one) of the plurality of parts may be arranged tangential to the drive sheave and/or in some examples, at least one of the plurality of parts may be arranged partially circumferentially around the drive sheave. In some examples, the retainer comprises at least one arc-shaped part. In some examples, the retainer may be connected to one or more of: the first support; the second support; and/or the intermediate connecting part (if present).

The retainer provides a physical barrier that prevents the tension member(s) from lifting away from the drive sheave(s) and/or from moving laterally across the surface of the drive sheave(s). This helps to ensure that the sheaves and tension members are suitably aligned and that torque is transmitted effectively from the drive sheave(s) to the tension member(s). The tension member(s) may comprise ropes, belts, cables, etc.

In some examples, the retainer comprises a substantially horizontal part situated above the drive sheave; and at least one substantially vertical part configured to connect the substantially horizontal part to the bedplate.

The substantially vertical part may be configured to connect the substantially horizontal part directly to the bedplate. In some examples, the substantially vertical part may be configured to connect the substantially horizontal part indirectly to the bedplate (e.g. via the intermediate connecting part). The substantially horizontal part and the substantially vertical part may be connected together in any suitable way (e.g. by an adhesive, by welding, and/or by one or more fasteners). In some examples, the substantially horizontal part and the substantially vertical part may be formed integrally as a single part.

In some examples, the drive assembly comprises a plurality of tension members; and wherein the at least one substantially vertical part of the retainer is configured to prevent the plurality of tension members from coming into contact with one another.

In examples where more than two tension members are present, a substantially vertical portion of the retainer may be provided between each of the adjacent tension members. For example, in a system with four tension members, the retainer may comprise three substantially vertical parts (i.e. one in-between each pair of adjacent tension members).

In some examples, the retainer is formed from sheet metal. As discussed above, sheet metal is lightweight and easy to work with.

In other examples, the retainer may be formed from plastic for greater weight savings.

In some examples, the first support is made from cast iron. This may be advantageous to closely fit around the face of the motor and/or in order to incorporate at least one bearing support integrally with the first support. Although cast iron is a heavy material, the volume used is much less than when the apparatus is formed of a unitary piece that extends from the motor to the brake unit. Therefore, in an example where the first support is formed of cast iron, the apparatus still possesses many of the advantages discussed above. The apparatus may still be lighter in weight and more adaptable than previous examples.

In some examples, the drive shaft extends from a face of the motor; wherein the first support is configured to substantially cover the face of the motor from which the drive shaft extends; and wherein the first support comprises an aperture for the drive shaft.

The first support may extend beyond the face of the motor (e.g. to connect to the bedplate of the elevator system or the intermediate connecting part).

In some examples, the second support is configured to substantially cover a face of the brake unit; and wherein the second support comprises an aperture to receive the drive shaft.

The second support may extend beyond the face of the brake unit (e.g. to connect to the bedplate of the elevator system or the intermediate connecting part).

In some examples, the first support is connected to the bedplate or the intermediate connecting part by at least one of: an adhesive; welding; and/or at least one fastener; and wherein the first support is connected to the motor by at least one of: an adhesive; welding; and/or at least one fastener.

In some examples, the second support is connected to the bedplate or the intermediate connecting part by at least one of: an adhesive; welding; and/or at least one fastener; and wherein the second support is connected to the brake unit by at least one of: an adhesive; welding; and/or at least one fastener.

In some examples, the intermediate connecting part is connected to the bedplate by at least one of: an adhesive; welding; and/or at least one fastener.

The various components of the apparatus may be connected to each other and to the bedplate of the elevator system in any suitable and desired manner. In some examples, more than one of the above methods of connection may be used together (e.g. two components may be welded and also secured using a fastener). Fasteners may include for example screws, bolts, brackets and/or rivets.

In some examples, some components of the apparatus may be connected together before the apparatus is installed in the elevator system. For example, the first support and/or second support may be connected to the intermediate connecting part before the apparatus is installed in the elevator system. However, in some examples, the components of the apparatus are only connected together during installation in the elevator system. This may help to ensure that the parts are highly configurable to the specific system in which they are being installed. For example, parts may be exchanged or their position may be adapted more easily when each component is provided separately from the others.

According to a second aspect of the present disclosure, there is provided a method of connecting a drive assembly to a bedplate of an elevator system, comprising the steps of: mounting a motor of the drive assembly to a first support; and mounting a brake unit of the drive assembly to a second support; wherein the first support and the second support are separate parts.

As discussed above, providing a first support and a second support that are separate parts allows the motor and the brake unit to be mounted to the apparatus separately. This may be advantageous because it facilitates adaptation of the positions of the components for the specific configuration of a given drive assembly. For example, the distance between the first support and the second support (and therefore between the motor and the brake unit) may be readily adjusted during the mounting process, as each component is mounted separately.

It will be understood that the features described above in relation to the first aspect of the disclosure may equally apply to the second aspect of the disclosure.

BRIEF DESCRIPTION OF THE DRAWINGS

Certain examples of the present disclosure will now be described with reference to the accompanying drawings in which.

DETAILED DESCRIPTION

Figure 1:
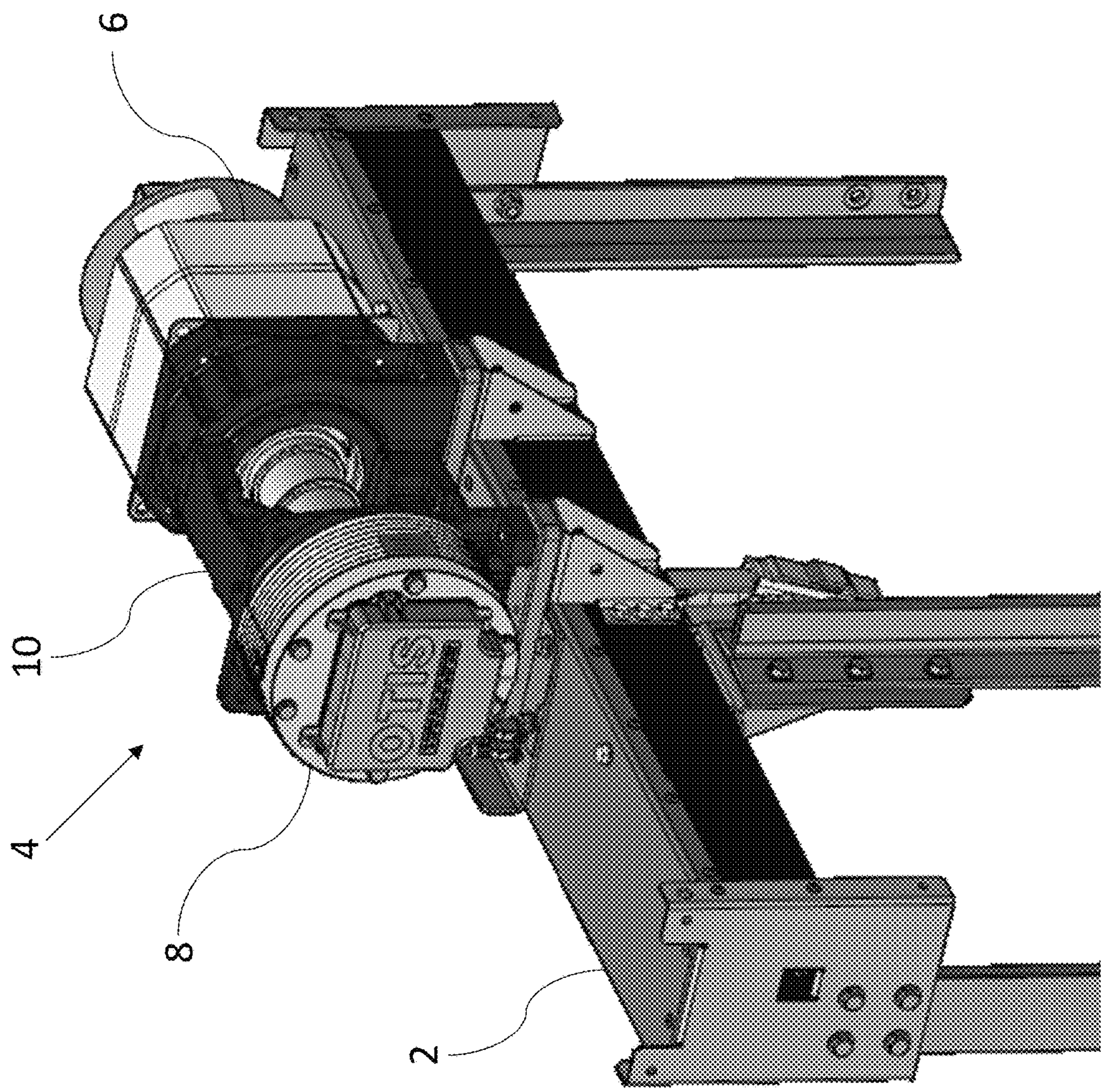
FIG. 1 is a perspective view of a prior art bedplate and drive assembly.

FIG. 1 is a perspective view of a prior art bedplate 2 and drive assembly 4. The bedplate 2 is provided at the top of an elevator shaft attached to the top of two guide rails. The bedplate 2 is provided at least in part to support the drive assembly 4.

In this example, the drive assembly comprises a motor 6, a brake 8 and apparatus 10 which is configured to connect the motor 6, the brake 8 and the bedplate 2. The apparatus 10 is also configured to provide rigidity to the drive assembly 4, which may help to reduce relative movement of the motor 6 and brake 8.

Figure 2:
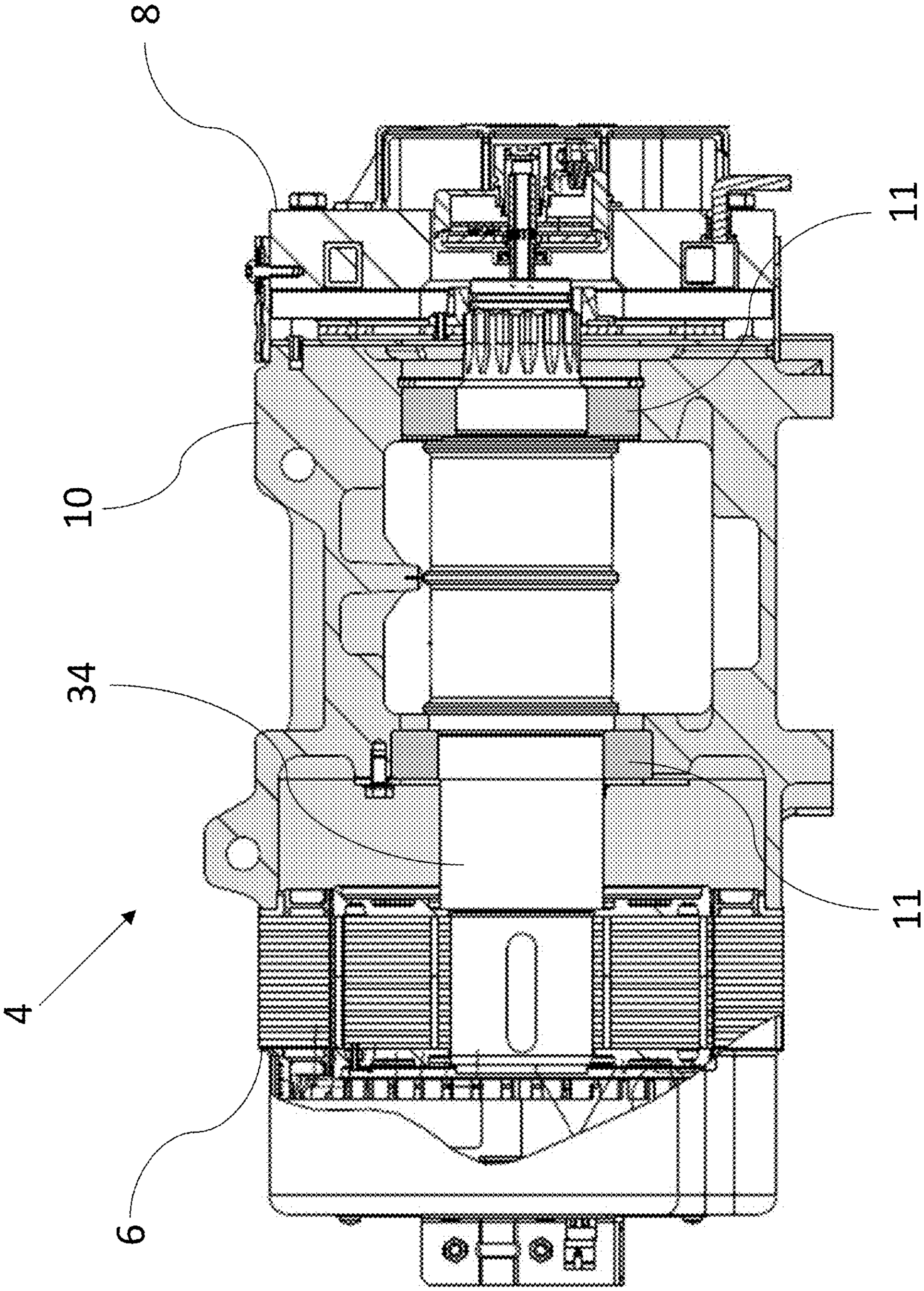
FIG. 2 is a cross-sectional view of a prior art drive assembly.

FIG. 2 is a cross-sectional view of a drive assembly 4 of FIG. 1. The apparatus 10 extends in a single piece from the motor 6 to the brake 8. The apparatus 10 is formed from cast iron, which is used at least in part due to its ability to be cast into a shape that fits to the motor 6 and brake 8 as well as accommodating bearings 11 at each end of the drive shaft 34. However, an apparatus 10 formed of cast iron is heavy, meaning that the bedplate 2 requires reinforcement means in order to support the weight of the apparatus 10. In addition, the apparatus 10 is specific to a particular installation. For example, for an elevator system with a longer drive shaft (e.g. to accommodate more tension members), the motor 6 and brake 8 need to be positioned further apart. A different cast iron case 10 needs to be created for each such installation. This is expensive and inconvenient.

Figure 3:
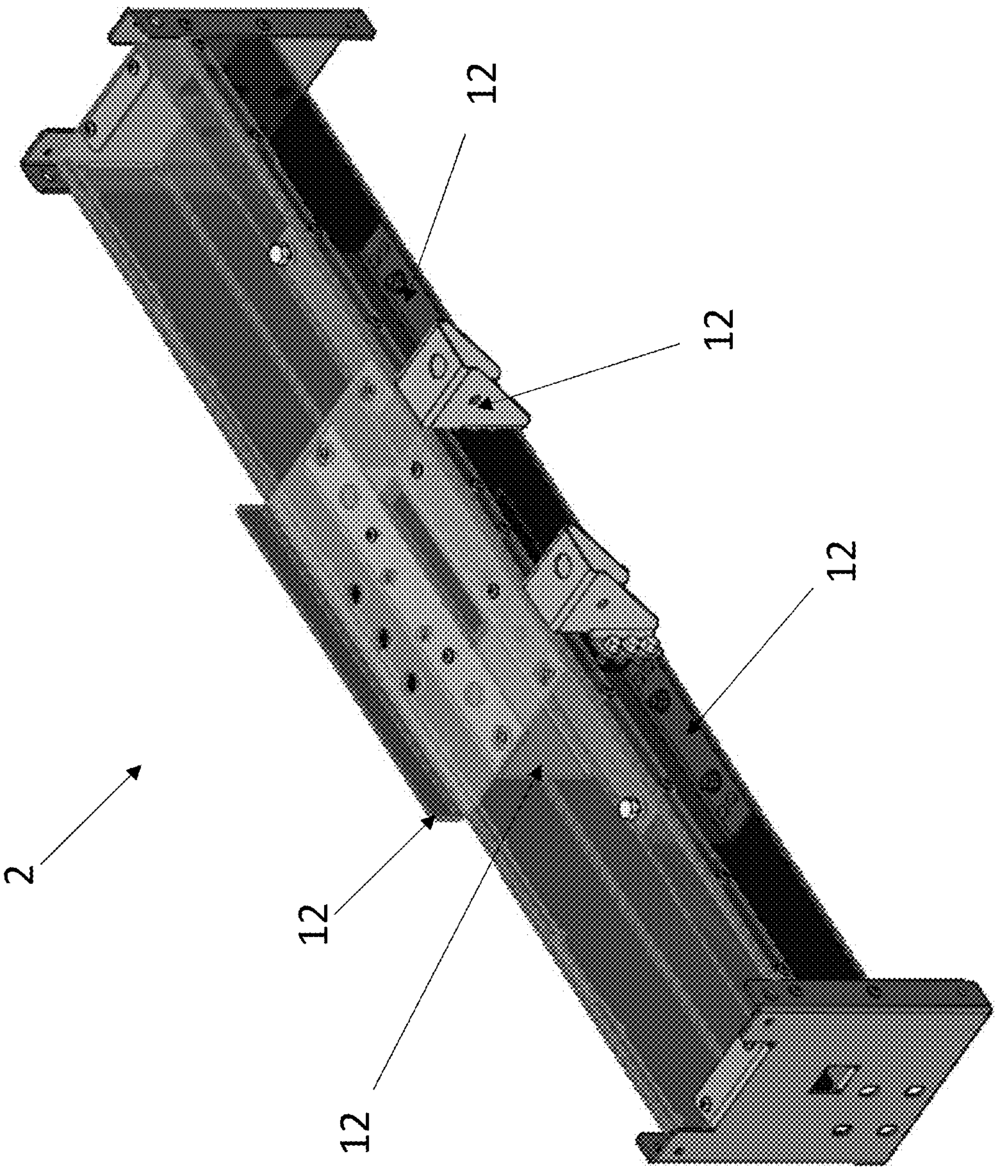
FIG. 3 is a perspective view of a prior art bedplate.

FIG. 3 is a perspective view of a prior art bedplate 2. In this example, the bedplate 2 includes a number of reinforcement means 12 which help to strengthen the bedplate 2 to support the weight of the drive assembly 4, as well as the forces involved in lifting and lowering the elevator car and counterweight (not shown). This bedplate 2 is thus formed from several component parts. The reinforcement means 12 may be located inside or outside of the bedplate 2 or both. The large number of component parts increases the cost and complexity of installation and maintenance of the bedplate 2.

Figure 4:
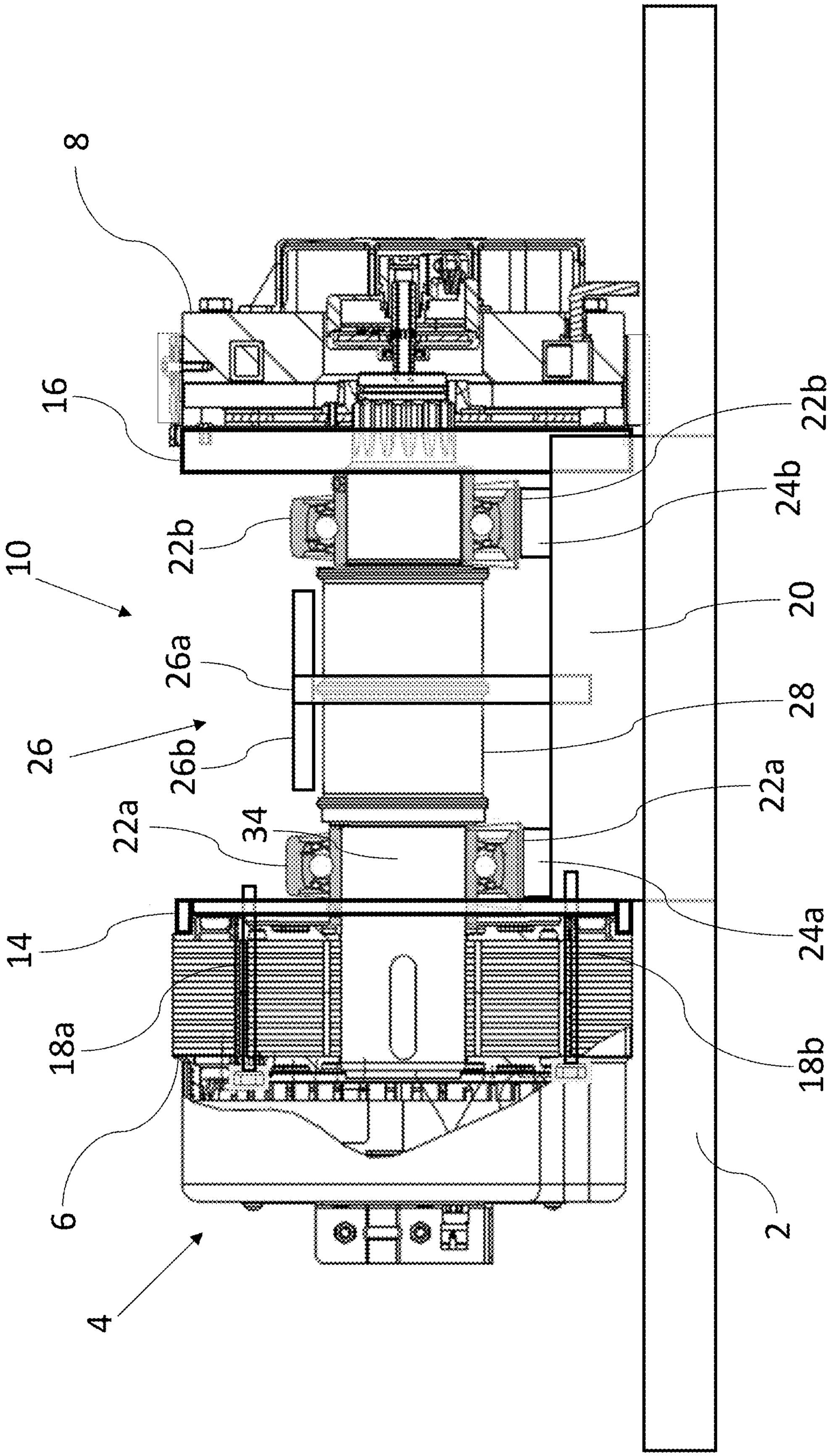
FIGS. 4-8 are cross-sectional views of bedplate and drive assemblies in accordance with examples of the present disclosure.

FIG. 4 is a cross-sectional view of a bedplate 2 and drive assembly 4 according to an example of the present disclosure. In this example, the drive assembly 4 comprises a motor 6, a brake 8 and an apparatus 10 which is configured to connect the motor 6, the brake 8 and the bedplate 2.

In this example of the present disclosure, the apparatus 10 is formed from a plurality of connected parts. In this example, the apparatus includes a first support 14 and a second support 16. The first support 14 is connected to the motor 6 and the second support 16 is connected to the brake 8. These components may be connected in any suitable way, for example by an adhesive, welding, or apparatus such as bolts 18*a*, 18*b*. The first support 14 and second support 16 are configured to provide rigidity to the drive assembly 4, which may help to reduce relative movement of the motor 6 and brake 8.

In this example, the apparatus 10 further includes an intermediate connecting part 20 which is configured to provide a connection between the first support 14, the second support 16 and the bedplate 2. Thus the motor 6 is mounted to the first support 14 which is mounted to the intermediate connecting part 20 which is mounted to the bedplate 2. Likewise, the brake 8 is mounted to the second support 16 which is mounted to the intermediate connecting part 20 which is mounted to the bedplate 2. In this way the motor 6 and the brake 8 are mounted indirectly to the bedplate 2.

It will be appreciated that in other examples, the first support 14 may be mounted directly to the bedplate 2 without an intermediate connecting part 20. Similarly, it will be appreciated that the second support 16 may be mounted directly to the bedplate 2 without an intermediate connecting part 20.

In other examples, either the first support 14 or the second support 16 may be formed integrally with the bedplate 2. The other of the first support 14 and the second support 16 is formed as a separate component and may be mounted directly to the bedplate 2 or may be mounted to the bedplate 2 indirectly via an intermediate connecting part 20.

In all of these examples, the fact that the motor 6 and brake 8 are mounted to separate supports 14, 16 means that the supports 14, 16 can be simplified and can be formed inexpensively, e.g. from sheet metal. The same first support 14 and second support 16 can be used in multiple installations, even where the distance between them needs to be varied for different installations. For example, where the first support 14 and second support 16 are mounted directly to the bedplate 2, there is no need for any component of the apparatus 10 to be specific to the installation. Where an intermediate connecting part 20 is used, there may be one intermediate connecting part provided for each of the first support 14 and the second support 16 (in which case, again these need not be specific to the installation) or there may be a single common intermediate connecting part 20 that needs to be specific to the installation, but which is much simpler in construction and design and can therefore be made much more simply and inexpensively than the former cast iron structure.

In some examples, the intermediate connecting part 20 and/or the first support 14 and/or the second support 16 may extend down the side of the bedplate 2, and in some examples may wrap around the bottom of the bedplate 2. This provides reinforcement to the bedplate 2 to help prevent bending of the bedplate 2 along its longitudinal axis. As these parts provide a dual function of mounting the motor 6 and brake 8 as well as reinforcing the bedplate 2, fewer components are required overall. This is because separate reinforcement structures for the bedplate (such as the reinforcement structures 12 shown in FIG. 3) are no longer required. Thus cost and weight and complexity overall can be reduced.

In this example (FIG. 4), the apparatus 10 further includes bearing stands 22*a*, 22*b*. The bearing stands 22*a*, 22*b* are configured to support each end of the drive shaft 34, e.g. by holding it in the correct position.

In this example, the apparatus 10 further includes two bearing stand supports 24*a*, 24*b* which raise the bearing stands 22*a*, 22*b* to the correct height and connect them to the intermediate connecting part 20. In some examples, the bearing stand supports 24*a*, 24*b* may connect the bearing stands 22*a*, 22*b* directly to the bedplate 2 instead.

In this example, the apparatus 10 further includes a retainer 26 which comprises a vertical portion 26*a* and a horizontal portion 26*b*. The retainer 26 is configured to keep the drive belts (not shown) in place over the drive sheave 28. This may be particularly advantageous in examples where there are a plurality of drive belts, as the retainer 26 may help to prevent the drive belts moving out of place and coming into contact with one another.

The apparatus 10 is formed primarily from sheet metal parts, which means that the apparatus 10 is significantly lighter than if it were made from cast iron. This reduced weight means that the bedplate 2 requires less (or even no) reinforcement, e.g. a reduced need for reinforcement means 12 such as those shown in FIG. 3. This reduces the number of parts in the bedplate 2, which in turn reduces the cost and complexity of manufacturing and installing the bedplate 2.

Furthermore, by forming the apparatus 10 from a combination of different parts rather than one single piece, the apparatus 10 may be readily adapted to different configurations. In particular, each component of the apparatus 10 may be modified to be suitable for a specific elevator system independently of the other components of the apparatus 10. Examples of some modifications are given in the following embodiments.

In some examples, the apparatus 10 may be formed from sheet metal at least in part in order to enable such modifications to be made. Sheet metal is easy to cut, meaning that changes to the shape and size of the components of the intermediate connecting part 10 can be made easily and at low cost. In some examples, these modifications could be made at the time of installation.

Figure 5:
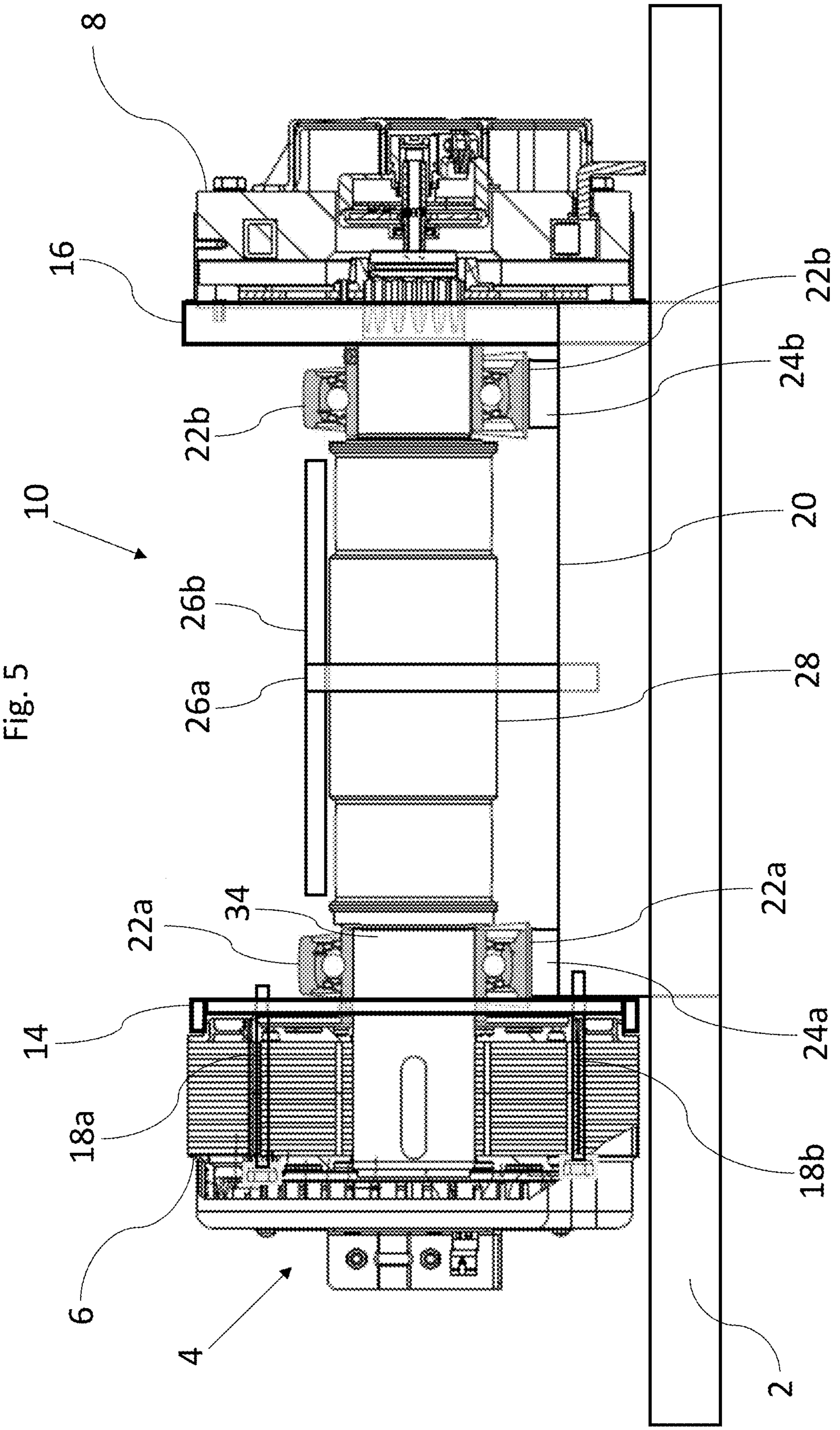

FIG. 5 is a cross-sectional view of a bedplate 2 and drive assembly 4 according to an example of the present disclosure. In this example there is a greater distance between the motor 6 and the brake 8 than in FIG. 4. It will be appreciated that the distance between the motor 6 and the brake 8 may vary for a variety of reasons (e.g. constraints of the system such as the shape and size of the elevator shaft, and/or the number and/or dimensions of the drive belts).

It can be seen that many of the components of the apparatus 10 are substantially identical to those in the embodiment shown in FIG. 4. These include: the first support 14; the second support 16; the bearing stands 22*a*, 22*b*; the bearing stand supports 24*a*, 24*b*; the vertical portion 26*a* of the retainer; and the bolts 18*a*, 18*b*. Therefore, in the examples of FIGS. 4 and 5, a number of the components used may be standardised between different embodiments of the disclosure.

In this example, the drive sheave 28 is longer than in the example of FIG. 4, in order to extend over the greater distance between the motor 6 and the brake 8. In this example, the drive sheave 28 includes a central portion which has a larger radius than the rest of the drive sheave 28. A drive belt (not shown) hangs from each of the smaller radius portions of the drive sheave 28. The larger radius central portion of the drive sheave 28 is configured to help separate the two drive belts and prevent them from coming into contact with one another.

In this example, the intermediate connecting part 20 and the horizontal portion 26*b* of the retainer are longer than those of the embodiment shown in FIG. 4 in order to accommodate the longer drive sheave 28. In some embodiments, the intermediate connecting part 20 and the horizontal portion 26*b* of the retainer shown in FIG. 5 may be cut (e.g. during installation) in order to accommodate the short drive sheave 28 of FIG. 4. This demonstrates one way that the intermediate connecting part 10 may be modified such that it is suitable for use in a particular embodiment of an elevator system.

Figure 6:
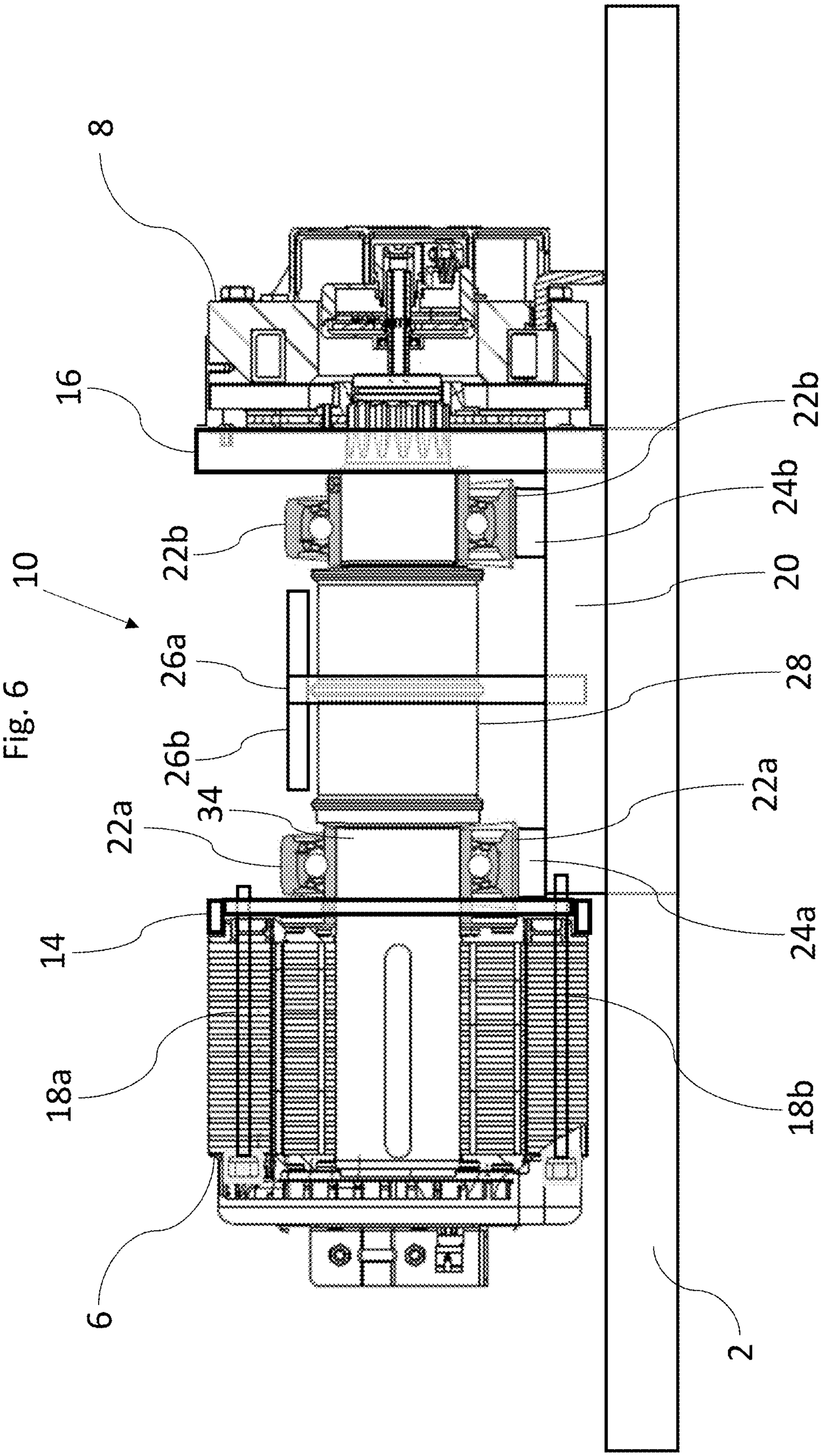

FIG. 6 is a cross-sectional view of a bedplate 2 and drive assembly 4 according to an example of the present disclosure. In this example, the motor 6 and brake 8 are shorter than in the embodiments of FIGS. 4 and 5. A drive assembly 4 with reduced height may be used due to constraints in the elevator system such as a small overhead (i.e. a small vertical space available above the bedplate 2 at the top of the elevator shaft).

In this example, the first support 14 and the second support 16 are shorter than in the previous examples, in order to accommodate the shorter motor 6 and brake 8. In some examples, the first support 14 and second support 16 shown in the examples of FIGS. 4 and 5 may be cut down in order to be used in the example of FIG. 6.

Figure 7:
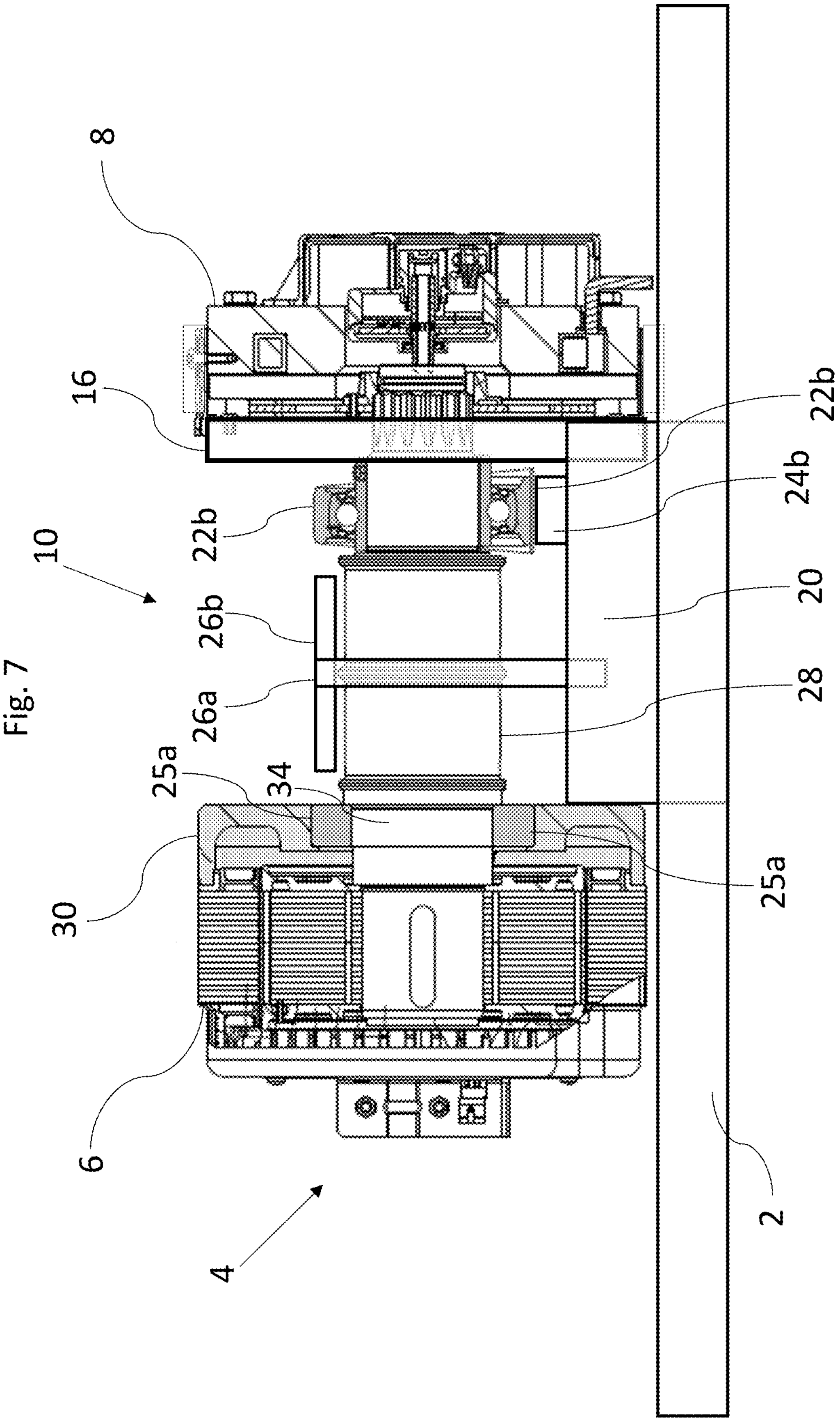

FIG. 7 is a cross-sectional view of a bedplate 2 and drive assembly 4 according to an example of the present disclosure. In this example, the first support 14 and one of the bearing stand supports 24*a* are formed as a single integrated part (also referred to as a motor flange 30). The motor flange 30 is configured to support the motor 6 and has bearings 25*a*, mounted directly in it. Therefore, in this example there is no bearing stand or bearing stand support adjacent the motor 6 as the motor flange 30 performs this function.

Figure 8:
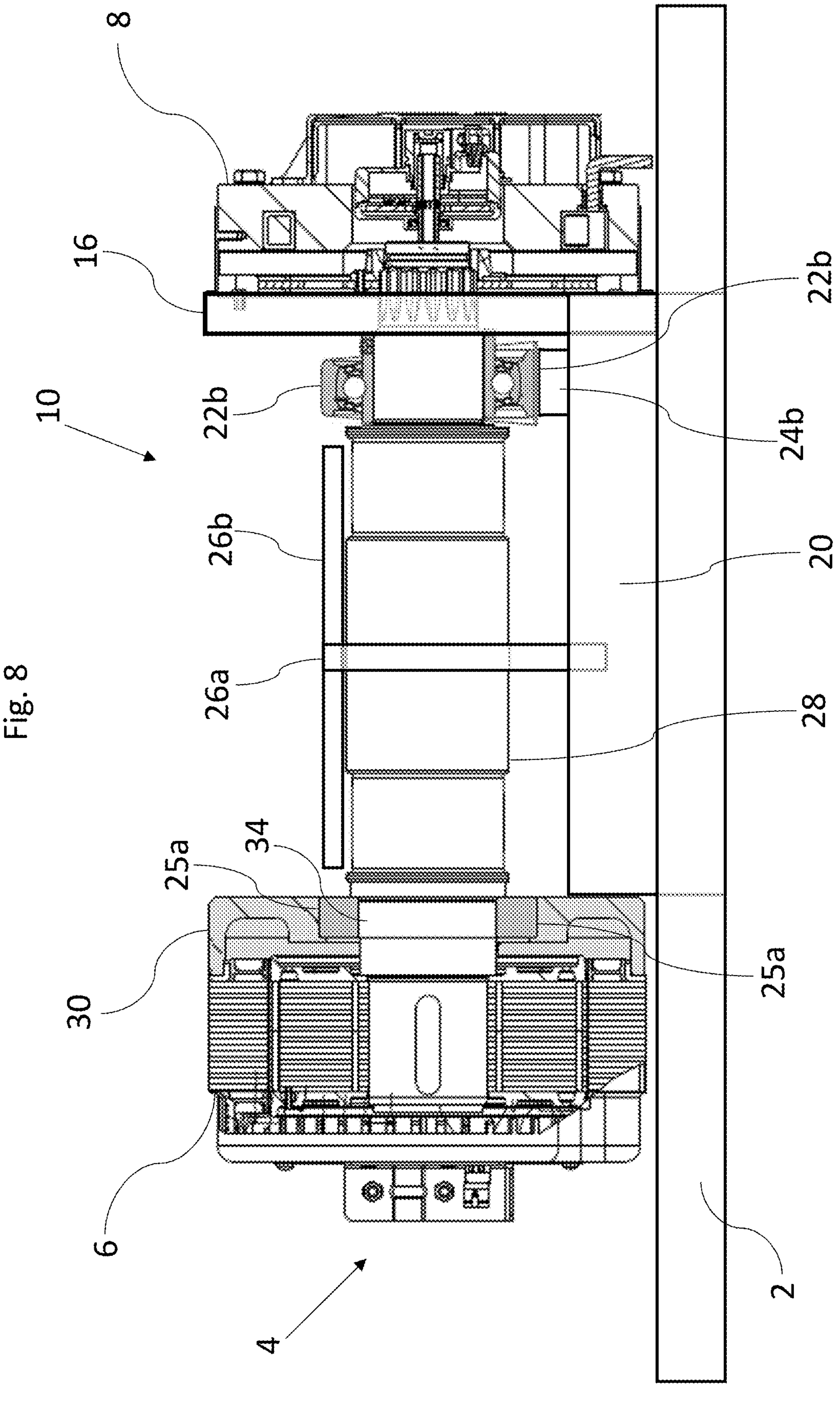

FIG. 8 is a cross-sectional view of a bedplate 2 and drive assembly 4 according to another example of the present disclosure. In this example, the drive sheave 28 is longer. However, in a similar manner to FIGS. 4 and 5, this example demonstrates that a number of components of the apparatus 10 are substantially identical to those in the embodiment shown in FIG. 7.

Figure 9:
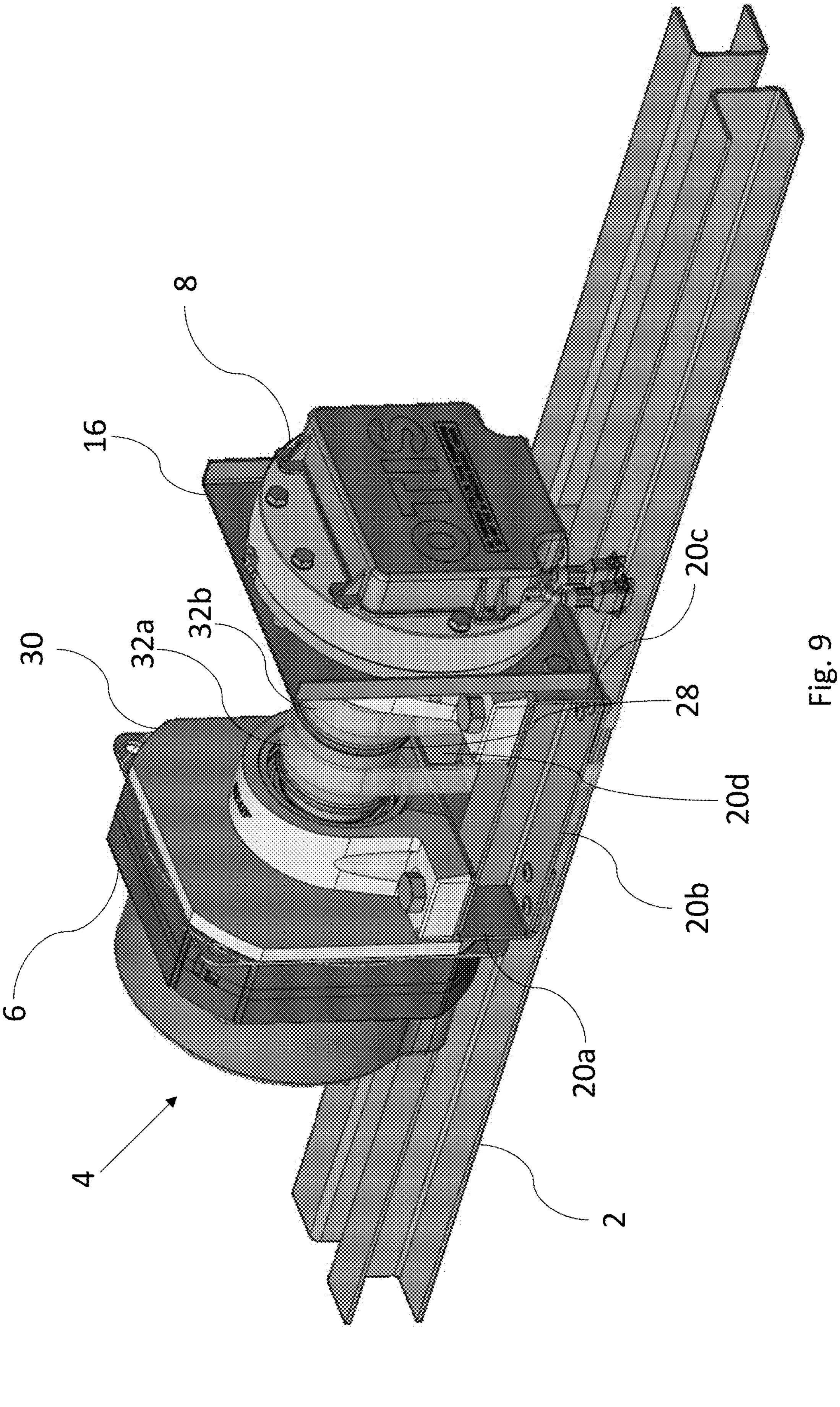
FIG. 9 is a perspective view of a bedplate and drive assembly in accordance with an example of the present disclosure.

FIG. 9 is a perspective view of a bedplate 2 and drive assembly 4 in accordance with an example of the present disclosure. In this example, the first support 14 is a motor flange 30 which is formed as a single piece with an integrated bearing stand 22*a*. In some examples, the motor flange 30 may be formed of cast iron. The second support 16 is formed from sheet metal bent into a squared c-shape with a large flat face substantially matching the size of the brake 8 and with sides bent at ninety degrees to the large flat face for added rigidity.

In this example no retainer is shown, but that is simply for clarity. The drive belts 32*a*, 32*b* can be seen wrapped around the drive sheave 28. Although two drive belts 32*a*, 32*b* are shown in this example, it will be appreciated that the drive assembly 4 may comprise any number of drive belts or other tension members such as ropes or cables.

In this example, the intermediate connecting part 20 is formed from four c-shaped parts 20*a-d*. Parts 20*a* and 20*c* are substantially perpendicular to the longitudinal axis of the bedplate 2, and parts 20*b* and 20*d* are substantially parallel to the longitudinal axis of the bedplate 2. Parts 20*a* and 20*c* wrap around an outside surface of parts 20*b* and 20*d*, such that the intermediate connecting part 20 is a quadrilateral with an open space in the centre. This open space may be configured to allow the drive belts 32*a*, 32*b* to extend downwards into the elevator shaft. The intermediate part 20 is thus formed from four simple folded sheet metal parts that are light weight, inexpensive to manufacture and easy to adjust for different sized installations.

In this example, the intermediate connecting part 20 is mounted on the top of the bedplate 2 and mounted thereto by fasteners (not shown). Parts 20*a-d* are connected together by fasteners. The first support (i.e. the motor flange 30) and the second support 16 are also connected to the intermediate connecting part 20 by fasteners.

It can be seen that in this example, the bedplate 2 does not require any reinforcement means. The bedplate 2 is formed from two c-shaped beams placed back-to-back thereby forming the equivalent of an I-beam. Each of these c-beams is a folded sheet metal part and is therefore simple, light weight and inexpensive. Therefore, by using an apparatus according to an embodiment of the present disclosure, the bedplate 2 is formed of fewer parts than the example shown in FIG. 3. This decreases the cost and complexity of manufacturing and installing the bedplate.

Figure 10:
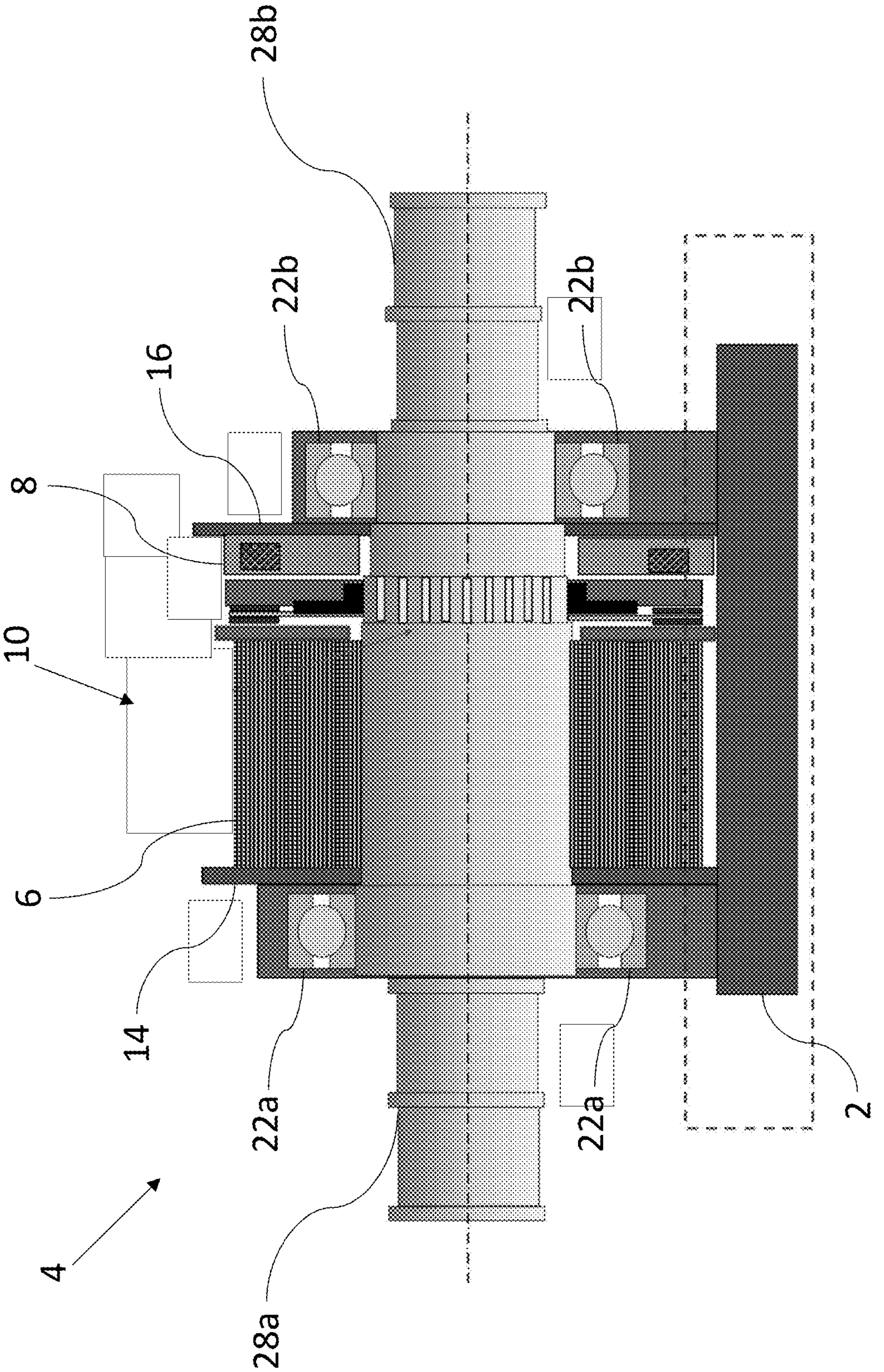
FIG. 10 is a cross-sectional view of a bedplate and drive assembly according to an example of the present disclosure.

FIG. 10 is a cross-sectional view of a bedplate 2 and drive assembly 4 according to an example of the present disclosure. This example shows another possible configuration of the drive assembly 4 and the apparatus 10.

In this example, the motor 6 and brake unit 8 are directly adjacent to one another. The motor 6 is mounted on the first support 14 and the brake 8 is mounted to the second support 16. The first support 14 and second support 16 are connected to the bedplate 2. The motor 6 and brake 8 may also be directly connected to one another.

In this example, the drive sheave 28 extends from either side of the motor 6 and brake unit 8. The drive sheave 28*a*, 28*b* is supported by the bearing stands 22*a*, 22*b*, which are located on either side of the motor 6 and brake unit 8. The bearing stands 22*a*, 22*b* are connected to the bedplate 2.

This example illustrates that the apparatus 10 may be adapted to different configurations of drive assemblies 4. Although the configuration of the drive assembly 4 differs from the examples illustrated in FIGS. 4-9, the apparatus may still be used to provide support to the drive assembly 4 of this example.

It will be appreciated by those skilled in the art that the disclosure has been illustrated by describing one or more specific aspects thereof, but is not limited to these aspects. Many variations and modifications are possible within the scope of the accompanying claims.

What is claimed is:

1. An apparatus (10) for connecting a drive assembly (4) to a bedplate (2) of an elevator system, the apparatus (10) comprising:

a first support (14) for mounting a motor (6) of the drive assembly (4) to the bedplate (2); and a second support (16) for mounting a brake unit (8) of the drive assembly (4) to the bedplate (2);

wherein the first support (14) and the second support (16) are separate individual parts;

wherein the first support (14) is formed from sheet metal; and/or wherein the second support (16) is formed from sheet metal; and/or wherein the intermediate connecting part (20) is formed from sheet metal;

wherein the drive assembly (4) further comprises a drive shaft (34) connected between the motor (6) and the brake unit (8); and wherein the apparatus (10) further comprises:

at least one bearing stand (22*a*, 22*b*) configured to support a drive shaft (34) of the drive assembly (4), the at least one bearing stand (22*a*, 22*b*) formed integrally with the first support (14) and/or the at least one bearing stand (22*a*, 22*b*) formed integrally with the second support (16); and at least one bearing stand support (24*a*, 24*b*), wherein each bearing stand support (24*a*, 24*b*) is configured to support the at least one bearing stand (22*a*, 22*b*) and to connect the at least one bearing stand (22*a*, 22*b*) to the bedplate (2).

2. An apparatus (10) as claimed in claim 1, further comprising an intermediate connecting part (20);

wherein at least one of the first support (14) and the second support (16) is connected to the bedplate (2) via the intermediate connecting part (20).

3. An apparatus (10) as claimed in claim 2, wherein the intermediate connecting part (20) extends along at least part of a side of the bedplate (2).

4. An apparatus (10) as claimed in claim 2, wherein the intermediate connecting part (20) extends along at least part of a bottom surface of the bedplate (2).

5. An apparatus (10) as claimed in claim 1, wherein the drive assembly (4) further comprises;

at least one drive sheave (28) mounted on the drive shaft (34); and at least one tension member wrapped at least partially around the at least one drive sheave (28);

wherein the apparatus (10) further comprises a retainer (26) configured to retain the at least one tension member on the at least one drive sheave (28).

6. An apparatus (10) as claimed in claim 5, wherein the retainer (26) comprises a substantially horizontal part (26*b*) situated above the drive sheave (28); and at least one substantially vertical part (26*a*) configured to connect the substantially horizontal part (26*b*) to the bedplate (2).

7. An apparatus (10) as claimed in claim 6, wherein:

the drive assembly (4) comprises a plurality of tension members; and the at least one substantially vertical part (26*a*) of the retainer (26) is configured to prevent the plurality of tension members from coming into contact with one another.

8. An apparatus (10) as claimed in claim 5, wherein the retainer (26) is formed from sheet metal.

9. An apparatus (10) as claimed in claim 1, wherein the drive shaft (34) extends from a face of the motor (6);

wherein the first support (14) is configured to substantially cover the face of the motor (6) from which the drive shaft (34) extends; and wherein the first support (14) comprises an aperture for the drive shaft (34).

10. An apparatus (10) as claimed in claim 1, wherein the second support (16) is configured to substantially cover a face of the brake unit (8); and wherein the second support (16) comprises an aperture to receive the drive shaft (34).

11. An apparatus (10) for connecting a drive assembly (4) to a bedplate (2) of an elevator system, the apparatus (10) comprising:

a first support (14) for mounting a motor (6) of the drive assembly (4) to the bedplate (2); and a second support (16) for mounting a brake unit (8) of the drive assembly (4) to the bedplate (2);

wherein the first support (14) and the second support (16) are separate individual parts;

wherein the drive assembly (4) further comprises a drive shaft (34) connected between the motor (6) and the brake unit (8);

the apparatus (10) further comprising:

at least one bearing stand (22*a*, 22*b*) configured to support a drive shaft (34) of the drive assembly (4);

at least one bearing stand support (24*a*, 24*b*) configured to support the at least one bearing stand (22*a*, 22*b*) and to connect the at least one bearing stand (22*a*, 22*b*) to the bedplate (2);

wherein the at least one bearing stand support (24*a*, 24*b*) is formed from sheet metal.

* * * * *